US 9,385,384 B2

(12) United States Patent
Tatsui et al.

(10) Patent No.: US 9,385,384 B2
(45) Date of Patent: Jul. 5, 2016

(54) POWER GENERATION SYSTEM AND METHOD OF OPERATING THE SAME

(75) Inventors: Hiroshi Tatsui, Shiga (JP); Junji Morita, Kyoto (JP); Akinori Yukimasa, Osaka (JP); Hidetoshi Wakamatsu, Shiga (JP); Atsutaka Inoue, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 314 days.

(21) Appl. No.: 14/002,302

(22) PCT Filed: Mar. 29, 2012

(86) PCT No.: PCT/JP2012/002171
§ 371 (c)(1),
(2), (4) Date: Aug. 29, 2013

(87) PCT Pub. No.: WO2012/132445
PCT Pub. Date: Oct. 4, 2012

(65) Prior Publication Data
US 2013/0337354 A1    Dec. 19, 2013

(30) Foreign Application Priority Data
Mar. 29, 2011    (JP) .................................. 2011-071645

(51) Int. Cl.
*H01M 8/04*    (2006.01)
*H01M 8/24*    (2016.01)
(Continued)

(52) U.S. Cl.
CPC ...... *H01M 8/04708* (2013.01); *H01M 8/04022* (2013.01); *H01M 8/04253* (2013.01);
(Continued)

(58) Field of Classification Search
CPC ..................... H01M 8/04335; H01M 8/04022; H01M 8/04708
USPC ................................................... 429/429, 441
See application file for complete search history.

(56) References Cited

U.S. PATENT DOCUMENTS

2008/0063902 A1    3/2008    Kawasaki et al.
2009/0004516 A1    1/2009    Bai et al.
(Continued)

FOREIGN PATENT DOCUMENTS

EP    1835240 A2    9/2007
JP    2002-093445 A    3/2002
(Continued)

OTHER PUBLICATIONS

Japanese Office Action issued in Japanese Application No. 2013-507193 dated Jun. 10, 2014.
(Continued)

*Primary Examiner* — Stewart Fraser
*Assistant Examiner* — Rachel L Zhang
(74) *Attorney, Agent, or Firm* — McDermott Will & Emery LLP

(57) ABSTRACT

A power generation system includes: an air intake passage; a fuel cell system that includes a fuel cell; a case configured to house the fuel cell, a ventilator (air supply unit), and an air intake temperature detector configured to detect a temperature of the intake air supplied to the case; a combustion device that includes a combustor; an exhaust gas passage configured to discharge a flue gas generated in the combustion device to the outside; and a controller. The air intake passage and the exhaust gas passage are configured to allow heat exchange to occur between media flowing through the passages. The controller causes the combustion device to operate when the fuel cell system is activated and the temperature detected by the air intake temperature detector is equal to or lower than a first predetermined temperature.

10 Claims, 11 Drawing Sheets

(51) Int. Cl.
*F24D 3/00* (2006.01)
*F24D 12/02* (2006.01)

(52) U.S. Cl.
CPC ...... *H01M8/04335* (2013.01); *H01M 8/04955* (2013.01); *F24D 3/00* (2013.01); *F24D 12/02* (2013.01); *F24D 2200/18* (2013.01); *F24D 2200/19* (2013.01); *F24H 2240/10* (2013.01); *H01M 8/04067* (2013.01); *H01M 8/2475* (2013.01); *H01M 2250/405* (2013.01); *Y02B 30/14* (2013.01); *Y02B 90/16* (2013.01); *Y02E 60/50* (2013.01)

(56) References Cited

U.S. PATENT DOCUMENTS

| | | | | |
|---|---|---|---|---|
| 2011/0081588 A1* | 4/2011 | Korytnikov | ....... | H01M 8/04007 429/429 |
| 2011/0143245 A1 | 6/2011 | Kawasaki et al. | | |
| 2015/0147672 A1* | 5/2015 | Tatsui | ................. | H01M 8/0662 429/440 |

FOREIGN PATENT DOCUMENTS

| | | |
|---|---|---|
| JP | 2004-164868 A | 6/2004 |
| JP | 2004-192889 A | 7/2004 |
| JP | 2005-032585 A | 2/2005 |
| JP | 2006-004699 A | 1/2006 |
| JP | 2006-032153 A | 2/2006 |
| JP | 2006-073446 A | 3/2006 |
| JP | 2006-253020 A | 9/2006 |
| JP | 2007-248009 A | 9/2007 |
| JP | 2008-108449 A | 5/2008 |
| JP | 2008-210631 A | 9/2008 |
| JP | 2009-238390 A | 10/2009 |
| JP | 2010-086916 A | 4/2010 |
| JP | 2010-257580 A | 11/2010 |
| WO | 2010/120565 A2 | 10/2010 |
| WO | 2013/153789 A1 | 10/2013 |

OTHER PUBLICATIONS

Extended European Search Report issued in European Application No. 12765572.8 dated Mar. 21, 2014, 6 pgs.

Japanese Office Action issued in corresponding Japanese Patent Application No. 2013-507193, mailed on Jun. 16, 2015; 4 pages in Japanese language.

International Search Report issued in PCT/JP2012/002171, dated Jun. 5, 2012, with English translation.

* cited by examiner

POWER GENERATION SYSTEM AND METHOD OF OPERATING THE SAME

RELATED APPLICATIONS

This application is the U.S. National Phase under 35 U.S.C. §371 of International Application No. PCT/JP2012/002171, filed on Mar. 29, 2012, which in turn claims the benefit of Japanese Application No. 2011-071645, filed on Mar. 29, 2011, the disclosures of which Applications are incorporated by reference herein.

TECHNICAL FIELD

The present invention relates to a power generation system including a fuel cell system and a combustion device, and a method of operating the power generation system.

BACKGROUND ART

A cogeneration system supplies generated electric power to users for electric power loads, and recovers and stores exhaust heat for hot water supply loads of the users, the exhaust heat being generated by the electric power generation. Known as this type of cogeneration system is a cogeneration system configured such that a fuel cell and a water heater operate by the same raw material (see PLT 1). The system of PLT 1 includes: a fuel cell; a heat exchanger configured to recover heat generated by the operation of the fuel cell; a hot water tank configured to store water having flowed through the heat exchanger to be heated; and a water heater configured to heat the water flowing out from the hot water tank up to a predetermined temperature. The system is configured such that the fuel cell and the water heater operate by the same raw material.

Moreover, a configuration is known, which is provided for the purpose of improving an exhaust performance of the fuel cell system provided inside a building (see PLT 2). In PLT 2, the fuel cell system provided and used inside the building including an intake port is disclosed. The system includes an air introducing port through which air inside the building is introduced to the inside of the fuel cell system, an air discharging pipe through which the air inside the fuel cell system is discharged to the outside of the building, and a ventilation unit. Air outside the building is introduced to the inside of the building through the intake port by the ventilation unit and to the inside of the fuel cell system through the air introducing port, and is discharged to the outside of the building through the air discharging pipe.

Further, a fuel cell system including a duct extending in a vertical direction is known, which is configured for the purpose of improving exhaust performance of an exhaust gas generated by the fuel cell system provided inside a building (see PLT 3). The duct provided in the fuel cell system of PLT 3 extends in the vertical direction inside the building and has an upper end portion located outside the building. Further, the duct has a double pipe structure having an inner passage and an outer passage, and a ventilating pipe and an exhaust pipe are coupled to the inner passage or the outer passage of the duct such that an exhaust gas or air independently flows through the inner passage and the outer passage of the duct.

Further, a fuel cell system that prevents water generated in a fuel cell from freezing is known (see PLT 4). In the fuel cell system of PLT 4, heat exchange occurs between exhaust gas from the fuel cell and intake air (external air) supplied to the fuel cell to heat the intake air and prevent the freezing.

CITATION LIST

Patent Literature

PLT 1: Japanese Laid-Open Patent Application Publication No. 2007-248009
PLT 2: Japanese Laid-Open Patent Application Publication No. 2006-73446
PLT 3: Japanese Laid-Open Patent Application Publication No. 2008-210631
PLT 4: Japanese Laid-Open Patent Application Publication No. 2009-238390

SUMMARY OF INVENTION

Technical Problem

However, in the case of the fuel cell system of PLT 4, for example, if the fuel cell system is activated from a stop state when a temperature of external air is below a freezing point, a temperature of the exhaust gas from the fuel cell does not increase sufficiently, and accordingly, the intake air is not heated and water generated in the fuel cell is likely to freeze. Further, in the fuel cell system, a configuration is generally adopted in which the external air is supplied to the inside of the case and then discharged in order to ventilate the case that houses the fuel cell or the like during operation of the fuel cell system. However, in the fuel cell system of PLT 4, heating of ventilation air is not described. Accordingly, if the external air below a freezing point is supplied as the ventilation air to the inside of the case when the fuel cell system is activated, cooling water of the fuel cell, condensation water or the like accumulated in a pipe for fuel gas or off gas during the stop state before activation is likely to freeze. Thus, in the fuel cell system of the related art, a solution to freezing when the fuel cell system is activated, particularly, in a state where a temperature of the external air is low, is insufficient.

The present invention is intended to solve the problems of the related art described above, and an object of the present invention is to provide a power generation system capable of preventing water inside the system from freezing due to intake air, particularly, at the time of activation of a fuel cell system, even when a temperature of the external air is low, and a method of operating the power generation system.

Solution to Problem

A power generation system according to the present invention is a power generation system including: an air intake passage; a fuel cell system including a fuel cell configured to generate electric power using a fuel gas and an oxidizing gas, a case configured to house the fuel cell, an air supply unit configured to supply external air to the case through the air intake passage, and an air intake temperature detector configured to detect a temperature of the intake air supplied to the case; a combustion device including a combustor configured to combust a fuel to generate an amount of heat; an exhaust gas passage configured to discharge a flue gas generated in the combustion device to the outside; and a controller, wherein the air intake passage and the exhaust gas passage are configured to allow heat exchange to occur between media flowing through the passages, and the controller causes the combustion device to operate when the fuel cell system is activated and the temperature detected by the air intake temperature detector is equal to or lower than a first predetermined temperature.

A method of operating a power generation system according to the present invention is a method of operating a power generation system including a fuel cell system, a combustion device, an air intake passage configured to supply external air to the fuel cell system, an exhaust gas passage configured to discharge a flue gas generated in the combustion device to the outside, the air intake passage and the exhaust gas passage configured to allow heat exchange to occur between media flowing through the passages, the method including the steps of: detecting a temperature of the intake air supplied to the fuel cell system through the air intake passage; determining whether the temperature of the intake air is equal to or lower than a first predetermined temperature; and causing the combustion device to operate when the temperature of the intake air is equal to or lower than the first temperature when the fuel cell system is activated.

According to the power generation system and the method of operating the power generation system, when the temperature of the intake air is at a temperature equal to or lower than the first temperature, the combustion device operates. If the combustion device operates, a high-temperature flue gas from the combustion device flows through the exhaust gas passage. When the intake air introduced to the inside of the case of the fuel cell system flows through the air intake passage, the intake air is heated by heat exchange with the flue gas flowing through the exhaust gas passage. Accordingly, it is possible to prevent condensation water or the like inside pipes of the fuel cell system from freezing due to low temperature intake air.

Advantageous Effects of Invention

According to the power generation system and the method of operating the power generation system of the present invention, even when the external air temperature is low, it is possible to prevent the water inside the system from freezing due to the intake air, particularly, at the time of activation of the fuel cell system.

DESCRIPTION OF EMBODIMENTS

Figure 1:
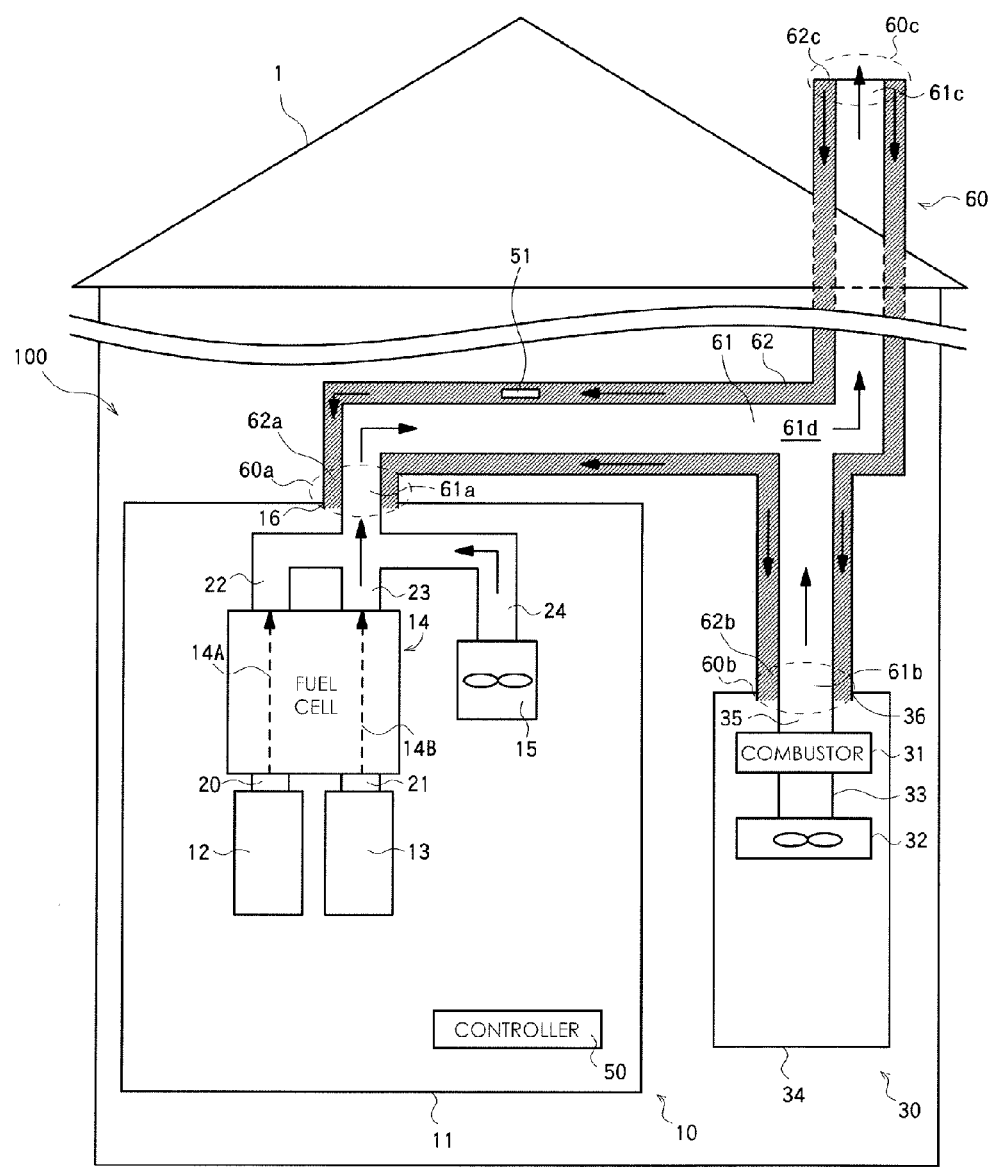
FIG. 1 is a schematic diagram showing a schematic configuration of a power generation system according to Embodiment 1 of the present invention.

A power generation system according to the present invention is a power generation system including: an air intake passage; a fuel cell system including a fuel cell configured to generate electric power using a fuel gas and an oxidizing gas, a case configured to house the fuel cell, an air supply unit configured to supply external air to the case through the air intake passage, and an air intake temperature detector configured to detect a temperature of the intake air supplied to the case; a combustion device including a combustor configured to combust a fuel to generate an amount of heat; an exhaust gas passage configured to discharge a flue gas generated in the combustion device to the outside; and a controller, wherein the air intake passage and the exhaust gas passage are configured to allow heat exchange to occur between media flowing through the passages, and the controller causes the combustion device to operate when the fuel cell system is activated and the temperature detected by the air intake temperature detector is equal to or lower than a first predetermined temperature.

Accordingly, when the temperature of the intake air is at a low temperature equal to or lower than the first temperature, a high-temperature flue gas from the combustion device flows through the exhaust gas passage due to the operation of the combustion device. The intake air introduced into the case of the fuel cell system is heated by heat exchange with the flue gas. Accordingly, it is possible to prevent condensation water or the like inside pipes of the fuel cell system from freezing due to the low temperature intake air.

Further, in the power generation system, the air intake temperature detector may be provided in the air intake passage or the case, and the controller may cause the combustion device to operate when the fuel cell system is activated and the temperature detected by the air intake temperature detector after operation of the air supply unit is equal to or lower than the first temperature.

Accordingly, external air can be taken in by an operation of the air supply unit, and a determination can be made as to whether a temperature of the external air is equal to or lower than the first temperature. Thus, it is possible to more reliably prevent freezing inside the system due to the intake air. Further, since the necessity of a solution to freezing based on the operation of the combustion device can be more accurately determined, it is possible to suppress consumption of the fuel due to unnecessary operation of the combustion device.

Further, in the power generation system, when the fuel cell system is activated and the temperature detected by the air intake temperature detector after the operation of the air supply unit is equal to or lower than a second predetermined temperature, the controller may stop the air supply unit and cause the combustion device to operate.

Accordingly, the air supply unit is stopped when the detected temperature is a low temperature equal to or lower than the second temperature. Therefore, it is possible to prevent the occurrence of freezing inside the system due to the low-temperature intake air. Further, since the combustion device operates while the air supply unit is stopped, it is possible to heat the exhaust gas passage. Thus, after the exhaust gas passage is heated sufficiently, it is possible to heat the intake air at the time of activation of the fuel cell system.

Further, in the power generation system, when the air supply unit is stopped as the air intake temperature detector detects a temperature equal to or lower than the second temperature, the controller may cause the combustion device to operate for a predetermined first time, and then cause the air supply unit to operate and activate the fuel cell system.

Accordingly, even when the air supply unit operates, it is possible to reliably prevent the occurrence of freezing inside the system due to the intake air. That is, the "first time" may be defined, for example, as a time from start of the operation of the combustion device until a state is reached in which the external air (intake air) can be appropriately heated by the heated exhaust gas passage even when the external air is introduced to the air intake passage.

Further, in the power generation system, when the air supply unit is stopped as the air intake temperature detector detects a temperature equal to or lower than the second temperature, the controller may cause the combustion device to operate until the air intake temperature detector detects a temperature equal to or higher than a third predetermined temperature, and then cause the air supply unit to operate and activate the fuel cell system.

Accordingly, even when the air supply unit operates, it is possible to reliably prevent the occurrence of freezing inside the system due to the intake air. That is, the "third temperature" may be defined, for example, as a temperature when an installation place of the air intake temperature detector is heated to appropriately heat the external air (intake air) even when the external air is introduced to the air intake passage by heating the exhaust gas passage through operation of the combustion device.

Further, in the power generation system, the second temperature may be set to be equal to or lower than the first temperature.

Accordingly, if the temperature of the intake air is equal to or lower than the first temperature, which is a low temperature, the combustion device operates, and if the temperature of the intake air is equal to or lower than the second temperature, which is set to be equal to or lower than the first temperature, the combustion device operates in a state where the air supply unit is stopped. Thus, the freezing prevention process can be appropriately performed in two steps according to the temperature of the intake air. Also, if the second temperature is set to be less than the first temperature, more preferred realization of the freezing prevention process according to the temperature of the intake air can be expected.

Further, in the power generation system, when the fuel cell system is activated and the temperature detected by the air intake temperature detector is equal to or lower than the first temperature, the controller may cause the combustion device to operate for a predetermined second time and then stop the combustion device.

As the "second time", a time until a temperature of the exhaust gas from the fuel cell system becomes sufficiently high and the intake air can be appropriately heated due to the exhaust gas can be adopted. Alternatively, a time until the freezing inside the system due to the intake air can be prevented through heating of the fuel cell system (e.g., a fuel processor) may be adopted.

Further, in the power generation system, when the fuel cell system is activated and the temperature detected by the air intake temperature detector is equal to or lower than the first temperature, the controller may cause the combustion device to operate until the temperature detected by the air intake temperature detector is equal to or higher than a fourth predetermined temperature, and then stop the combustion device.

As the "fourth temperature", a temperature in which the intake air can be appropriately heated by the exhaust gas from the fuel cell system whose temperature becomes sufficiently high may be adopted. Alternatively, a temperature in which freezing inside the system due to the intake air can be prevented through heating of the fuel cell system (e.g., a fuel processor) may be adopted.

Further, in the power generation system, when the temperature detected by the air intake temperature detector is equal to or lower than the first temperature and the fuel cell system is activated, the controller may cause the combustion device to operate before the activation of the fuel cell system.

Thus, it is possible to more reliably prevent freezing inside the system from occurring due to the intake air at the time of activation of the fuel cell system.

Further, in the power generation system, the exhaust gas passage may include a passage extending from an upstream end connected to the fuel cell system, a passage extending from an upstream end connected to the combustion device, a joining portion in which both of the passages are joined, and a passage extending from the joining passage to a downstream end opened to atmosphere, and the air intake passage may be provided to make contact with at least a portion of the exhaust gas passage.

Accordingly, it is possible to effectively perform heat exchange between the flue gas and the intake air. Further, a typical double pipe structure having an inner passage and an outer passage may be adopted as the air intake passage and the exhaust gas passage.

A method of operating a power generation system according to the present invention is a method of operating a power generation system including a fuel cell system, a combustion device, an air intake passage configured to supply external air to the fuel cell system, an exhaust gas passage configured to discharge a generated flue gas to the outside, the air intake passage and the exhaust gas passage being configured to allow heat exchange to occur between media flowing through the passages, the method including the steps of: detecting a temperature of the intake air supplied to the fuel cell system through the air intake passage; determining whether the temperature of the intake air is equal to or lower than a first predetermined temperature; and causing the combustion device to operate when the temperature of the intake air is equal to or lower than the first temperature when the fuel cell system is activated.

Hereinafter, preferred embodiments of the present invention will be described with reference to the drawings. In the drawings, the same reference signs are used for the same or corresponding components, and a repetition of the same description is avoided. Moreover, in the drawings, only components necessary to describe the present invention are shown, and the other components are not shown. Further, the present invention is not limited to the following embodiments.

Embodiment 1

FIG. 1 is a schematic diagram showing the schematic configuration of a power generation system according to Embodiment 1 of the present invention. As shown in FIG. 1, a power generation system 100 according to Embodiment 1 is provided in a building 1. The power generation system 100 includes a fuel cell system 10, a combustion device 30, a controller 50, and an air intake and exhaust mechanism 60.

The fuel cell system 10 includes a case 11. A fuel gas supply unit 12, an oxidizing gas supply unit 13, a fuel cell 14, and a ventilator 15 (air supply unit) are housed in the case 11. The controller 50 is also provided in the case 11. Further, in Embodiment 1, a configuration in which the controller 50 is provided in the case 11 is illustrated, but Embodiment 1 is not limited thereto. For example, a configuration in which the controller 50 is provided outside the case 11 may be adopted.

A hole 16 penetrating a wall portion constituting the case 11 in a thickness direction of the wall portion is formed at an appropriate position of the wall portion. A first end portion 60a of a double pipe constituting the air intake and exhaust mechanism 60 is connected to the hole 16. In the air intake and exhaust mechanism 60, an inner passage of the double pipe forms an exhaust gas passage 61, and an outer passage thereof forms an air intake passage 62. Further, the first end portion 60a of the air intake and exhaust mechanism 60 forms a first exhaust gas upstream end 61a of the exhaust gas passage 61 and also forms a first air intake downstream end 62a of the air intake passage 62.

Further, the air intake and exhaust mechanism 60 includes a second end portion 60b connected to the combustion device 30 and a third end portion 60c located outside the building 1, in addition to the first end portion 60a. Also, the exhaust gas passage 61 on the inner side of the double pipe forms a second exhaust gas upstream end 61b at the second end portion 60b, and forms a common exhaust gas downstream end 61c at the third end portion 60c. Further, the air intake passage 62 on the outer side forms a second air intake downstream end 62b at the second end portion 60b, and forms a common air intake upstream end 62c at the third end portion 60c.

Accordingly, the exhaust gas passage 61 includes a passage extending from the first exhaust gas upstream end 61a, a passage extending from the second exhaust gas upstream end 61b, a joining portion 61d in which both of the passages are joined, and a passage extending from the joining portion 61d to the common exhaust gas downstream end 61c opened to the atmosphere. Also, the air intake passage 62 is formed so as to surround an outer periphery of the exhaust gas passage 61 while being in contact with the exhaust gas passage 61.

In the exhaust gas passage 61, the first exhaust gas upstream end 61a is connected to the case 11 to guide the exhaust gas, which is from the fuel cell system 10, through the common exhaust gas downstream end 61c to the outside. Further, in the air intake passage 62, the first air intake downstream end 62a is connected to the case 11 to guide external air (intake air) taken from the common air intake upstream end 62c to the inside of the case 11 of the fuel cell system 10.

The fuel gas supply unit 12 supplies a fuel gas (hydrogen gas) to the fuel cell 14 in such a manner that a flow rate of the gas can be adjusted. A specific configuration of the fuel gas supply unit 12 is not limited. For example, a hydrogen generation device that generates hydrogen from a hydrocarbon-based raw material gas or a hydrogen cylinder may be adopted or a configuration capable of supplying hydrogen gas, such as a hydrogen absorbing alloy, may be adopted. Further, a fuel gas supply passage 20, which is a fuel gas passage, is connected between the fuel gas supply unit 12 and the fuel cell 14 (to be precise, an inlet of a fuel gas channel 14A of the fuel cell 14).

The oxidizing gas supply unit 13 supplies an oxidizing gas (air) to the fuel cell 14 in such a manner that a flow rate of the gas can be adjusted. A specific configuration of the oxidizing gas supply unit 13 is not limited. For example, the oxidizing gas supply unit 13 may be constituted by a fan, a blower, or the like. Further, an oxidizing gas supply passage 21, which is an oxidizing gas passage, is connected between the oxidizing gas supply unit 13 and the fuel cell 14 (to be precise, an inlet of an oxidizing gas channel 14B of the fuel cell 14).

The fuel cell 14 includes an anode and a cathode (both not shown). In the fuel cell 14, the fuel gas is supplied to the anode while the fuel gas is flowing through the fuel gas channel 14A. Further, the oxidizing gas is supplied to the cathode while the oxidizing gas is flowing through the oxidizing gas channel 14B. The fuel gas supplied to the anode and the oxidizing gas supplied to the cathode react with each other to generate electricity and heat.

The generated electricity is supplied to an external electric power load (for example, a home electrical apparatus) by an electric power conditioner, not shown. The generated heat is recovered by a heat medium flowing through a heat medium channel, not shown. The heat recovered by the heat medium can be used to, for example, heat water. Further, in Embodiment 1, various fuel cells, such as a polymer electrolyte fuel cell and a solid-oxide fuel cell, may be used as the fuel cell 14. Further, since the configuration of the fuel cell 14 is similar to that of a typical fuel cell, a detailed explanation thereof is omitted.

An upstream end of an off fuel gas passage 22 is connected to an outlet of the fuel gas channel 14A. A downstream end of the off fuel gas passage 22 is connected to the first exhaust gas upstream end 61a of the exhaust gas passage 61. Further, an upstream end of an off oxidizing gas passage 23 is connected to an outlet of the oxidizing gas channel 14B. A downstream end of the off oxidizing gas passage 23 is connected to the first exhaust gas upstream end 61a of the exhaust gas passage 61. Further, in Embodiment 1, the off fuel gas passage 22 and the off oxidizing gas passage 23 are joined on the way and then connected to the exhaust gas passage 61.

With this, the fuel gas unconsumed in the fuel cell 14 (hereinafter referred to as an "off fuel gas") is discharged from the outlet of the fuel gas channel 14A to the exhaust gas passage 61 through the off fuel gas passage 22. Further, the oxidizing gas unconsumed in the fuel cell 14 (hereinafter referred to as an "off oxidizing gas") is discharged from the outlet of the oxidizing gas channel 14B to the exhaust gas passage 61 through the off oxidizing gas passage 23. The off fuel gas discharged to the exhaust gas passage 61 is diluted by the off oxidizing gas to be discharged to the outside of the building 1.

The ventilator 15 is connected to the first exhaust gas upstream end 61a of the exhaust gas passage 61 through a ventilation passage 24. Further, in Embodiment 1, the ventilation passage 24 is also joined with the off fuel gas passage 22 and the off oxidizing gas passage 23 and then is connected to the exhaust gas passage 61. Accordingly, when the ventilator 15 is activated, air outside the fuel cell system 10 (here, air outside the building 1) is supplied from the hole 16 forming an air supply port (to be precise, the first air intake downstream end 62a) to the inside of the case 11. Also, the gas (mainly air) in the case 11 is discharged to the outside of the building 1 through the ventilation passage 24 and the exhaust gas passage 61. Thus, the inside of the case 11 is ventilated.

Further, the ventilator 15 may have any configuration as long as it can ventilate the inside of the case 11. For example, a fan or a blower may be used as the ventilator 15. Further, while the configuration in which the ventilator 15 is provided in the case 11 has been illustrated, Embodiment 1 is not limited thereto and the ventilator 15 may be provided in the exhaust gas passage 61.

Thus, in Embodiment 1, the off fuel gas, the off oxidizing gas, and the gas (mainly air) discharged from the inside of the case 11 by ventilation are illustrated as exhaust gases discharged from the fuel cell system 10 through the exhaust gas passage 61. Further, the exhaust gases from the fuel cell system 10 are not limited to these gases. For example, if the fuel gas supply unit 12 is configured of a hydrogen generation device, gases discharged from the hydrogen generation device (a flue gas, a hydrogen-containing gas, and the like) may also be included in the exhaust gases from the fuel cell system 10.

Further, in Embodiment 1, the oxidizing gas and the gas (air) supplied to the inside of the case 11 by ventilation are illustrated as external air supplied to the fuel cell system 10. Further, the external air supplied to the fuel cell system is not limited to such a gas (air). For example, if the fuel gas supply unit 12 is configured of a hydrogen generation device, combustion air supplied to the hydrogen generation device, and if the hydrogen generation device includes a selective oxidation device, selective oxidation air may also be included in the external air supplied to the fuel cell system 10. Further, air (bleed air) supplied to prevent the poisoning of a catalyst due to carbon monoxide to the anode of the fuel cell 14 may also be included in the external air.

Meanwhile, the combustion device 30 includes a combustor 31, a combustion fan 32 that supplies air to the combustor 31 through a combustion air supply passage 33, and a case 34 that houses the combustor 31 and the combustion fan 32. Further, the combustion fan 32 may have any configuration as long as it can supply combustion air to the combustor 31 and, for example, the combustion fan 32 may be constituted by a fan, a blower, or the like.

A combustible gas, such as a natural gas, and a combustion fuel, such as a liquid fuel, are supplied to the combustor 31 from a combustion fuel supply unit, not shown. One example of the liquid fuel is kerosene. The combustor 31 combusts the combustion air supplied from the combustion fan 32 and the combustion fuel supplied from the combustion fuel supply unit to generate heat and a flue gas. The generated heat can be used to heat water. To be specific, the combustion device 30 may be used as a boiler.

Further, an upstream end of a flue gas passage 35 is connected to the combustor 31, and a downstream end thereof is connected to the second exhaust gas upstream end 61b of the exhaust gas passage 61. Accordingly, the flue gas generated in the combustor 31 is discharged to the exhaust gas passage 61 through the flue gas passage 35. Also, the flue gas discharged to the exhaust gas passage 61 flows through the exhaust gas passage 61 to be discharged to the outside of the building 1.

Further, a hole 36 penetrating a wall portion constituting the case 34 of the combustion device 30 in a thickness direction of the wall portion is formed at an appropriate position of the wall portion, and the second end portion 60b of the air intake and exhaust mechanism 60 is connected to the hole 36. Also, the second exhaust gas upstream end 61b of the exhaust gas passage 61 on the inner side is connected to the combustor 31 through the flue gas passage 35, as described above. Meanwhile, the second air intake downstream end 62b of the air intake passage 62 on the outer side is in communication with the case 34 through the hole 36. Accordingly, when the combustion device 30 operates, a flue gas with a relatively high temperature, which is discharged from the combustion device 30, flows through the exhaust gas passage 61 to be discharged to the outside. Further, air flowing through the air intake passage 62 is heated by heat exchange with the flue gas with a high temperature flowing through the exhaust gas passage 61.

The controller 50 may be any device as long as it has a function of controlling respective devices constituting the power generation system 100. For example, the controller 50 according to Embodiment 1 includes a calculation processing portion, such as a microprocessor or a CPU, and a storage portion, such as a memory, configured to store programs for executing respective control operations. Also, in the controller 50, the calculation processing portion reads out and executes a predetermined program stored in a storage portion to realize various functions, which will be described below, in addition to a basic power generation operation of the power generation system 100.

Further, the controller 50 may be constituted by a single controller or may be constituted by a group of a plurality of controllers which cooperate to execute control operations of the power generation system 100. Further, the controller 50 may be constituted by a microcomputer or may be constituted by a MPU, a PLC (programmable logic controller), a logic circuit, or the like.

Further, the power generation system 100 according to Embodiment 1 includes an air intake temperature detector 51 that detects a temperature of the intake air supplied to the case 11 of the fuel cell system 10. In Embodiment 1, the air intake temperature detector 51 is provided on the way from the common air intake upstream end 62c to the first air intake downstream end 62a in the air intake passage 62. More precisely, the air intake temperature detector 51 is provided between a branch portion directed to each of the fuel cell system 10 and the combustion device 30 and the first air intake downstream end 62a. Further, the provision of the air intake temperature detector 51 is not limited thereto. For example, the air intake temperature detector 51 may be provided in such a manner that only a sensor portion thereof is exposed to the air intake passage 62 and the other portions thereof are provided outside the air intake passage 62.

Next, an operation of the power generation system 100 according to Embodiment 1 will be described. When a temperature of the intake air is low (equal to or lower than a first predetermined temperature), the present power generation system 100 performs a freezing prevention process for the inside of the system. Further, "activation" of the fuel cell system 10 used in the following description refers to an operation during a transition of the fuel cell 14 from a stop state to a power generation state. For example, operation start of the ventilator 15 for supplying the oxidizing gas to the fuel cell 14 may be used as a start point of the "activation". Further, as will be described below, there is a case in which the ventilator 15 operates in the freezing prevention process. However, the operation of the ventilator 15 in this case may be only for the freezing prevention process or may be for both the freezing prevention process and the activation of the fuel cell system 10.

Example 1 of Freezing Prevention Process

Figure 2:
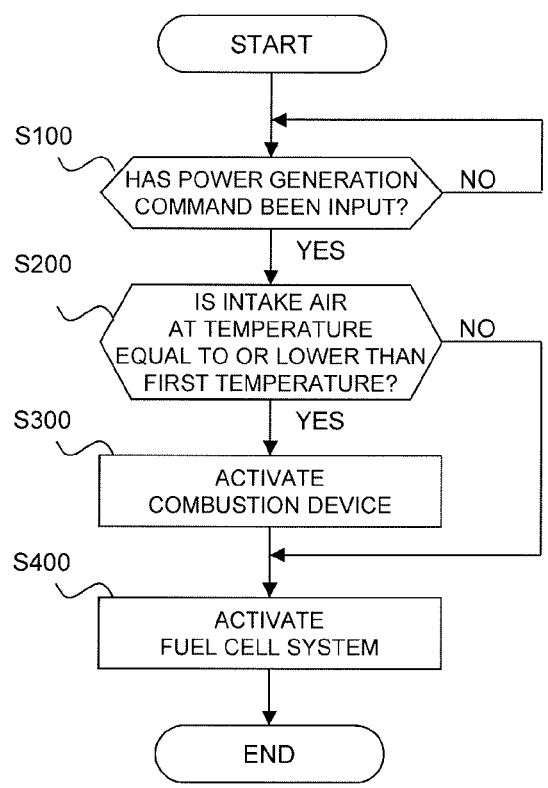
FIG. 2 is a flowchart showing an operation of the power generation system according to Example 1.

FIG. 2 is a flowchart showing an operation of the power generation system 100 according to Example 1. As shown in FIG. 2, the controller 50 determines whether a power generation command has been input to the fuel cell system 10 (step S100). Examples of cases in which the power generation command is input may include a case in which a user of the fuel cell system 10 manipulates a remote control, which is not shown, to operate the fuel cell system 10, and a case in which it is a start time of an operation of the fuel cell system 10 scheduled in advance.

When the controller 50 determines that the power generation command has not been input (step S100: No), the controller 50 repeatedly performs the process of step S100 until the power generation command is input. On the other hand, when the controller 50 determines that the power generation command has been input (step S100: Yes), the controller 50 acquires a measurement value of the air intake temperature detector 51, and determines whether the acquired temperature of the intake air is equal to or lower than a first predetermined temperature T1 (step S200).

Further, an upper limit temperature at which freezing inside the system occurs due to the intake air taken into the case 11 of the fuel cell system 10 may be acquired through a test or the like in advance, and the upper limit temperature may be used as the first temperature T1. Alternatively, an appropriate predetermined value (e.g., 0° C.) may be set as the first temperature T1, without conducting the test or the like.

If the intake air is determined to be at a temperature equal to or lower than the first temperature T1 (step S200: YES), the combustion device 30 is activated (step S300). Also, the fuel cell system 10 is activated (step S400). On the other hand, if the intake air is determined to be at a temperature higher than the first temperature (step S200: NO), the fuel cell system 10 is activated without activating the combustion device 30 (step S400).

Through execution of the freezing prevention process as described above, even when the external air taken in as the intake air is at a low temperature, the intake air is heated by a high-temperature flue gas generated by the activation of the combustion device 30, thereby preventing freezing inside the system due to the intake air.

While FIG. 2 shows the flow of executing the activation of the fuel cell system 10 (step S400) after the activation of the combustion device 30 (step S300), the present invention is not limited thereto. The activation of the combustion device 30 and the activation of the fuel cell system 10 may be performed at a substantially simultaneous timing, or the activation of the fuel cell system 10 may be performed earlier than the activation of the combustion device 30 by a slight margin. However, it is desirable to execute the activation of the combustion device 30 and the activation of the fuel cell system 10 in the order shown in FIG. 2 because the freezing inside the system can be prevented more reliably.

Further, there may be a case in which the combustion device 30 is already operating when the combustion device 30 is activated in step S300. For example, when a boiler is adopted as the combustion device 30, the combustion device 30 operates according to a hot water supply situation regardless of the presence or absence of a power generation command. Accordingly, in the case of this configuration, there may be performed a process of determining whether the combustion device 30 is in operation before the combustion device 30 is activated in step S300, and activating the combustion device 30 when the combustion device 30 is not in operation (step S300).

Variations of an aspect about an activation timing of the fuel cell system 10 and the determination as to whether the combustion device 30 is in operation as described above may be applied in each example, which will be described below.

Example 2 of Freezing Prevention Process

Figure 3:
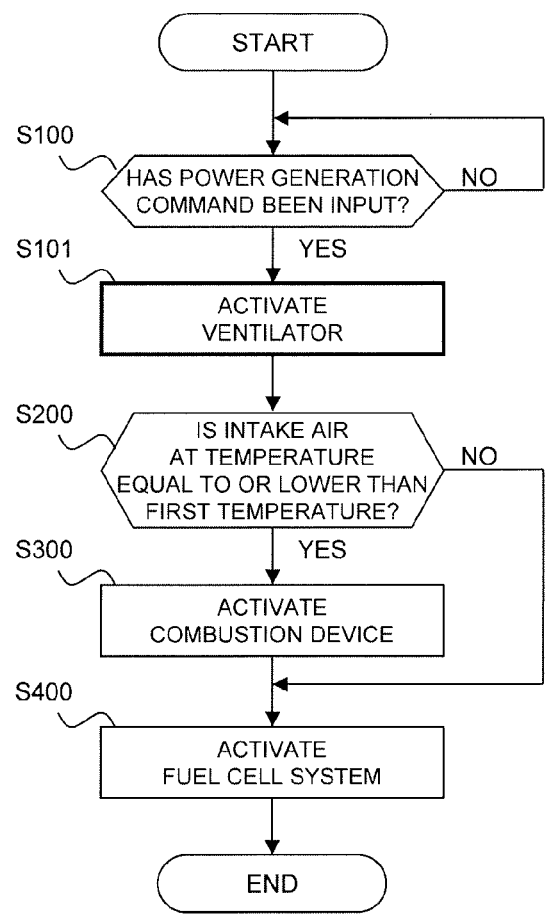
FIG. 3 is a flowchart showing an operation of the power generation system according to Example 2.

FIG. 3 is a flowchart showing an operation of the power generation system 100 according to Example 2. Even in the flow shown in FIG. 3, the process of each step illustrated in Example 1 is performed. However, in Embodiment 2, a process of starting up the ventilator 15 (step S101) is performed between the process of step S100 and the process of step S200. That is, when there is an input of the power generation command (step S100), the ventilator 15 is activated (step S101) and then a determination of the temperature of the intake air is performed (step S200).

A determination of the temperature of the intake air based on the temperature of the taken-in external air (step S200) may be performed by performing such a freezing prevention process. Accordingly, it is possible to more reliably prevent freezing inside the system due to the intake air. Further, since a more appropriate temperature determination for freezing prevention can be made, it is possible to prevent unnecessary activation of the combustion device 30 and suppress consumption of the fuel.

Example 3 of Freezing Prevention Process

Figure 4:
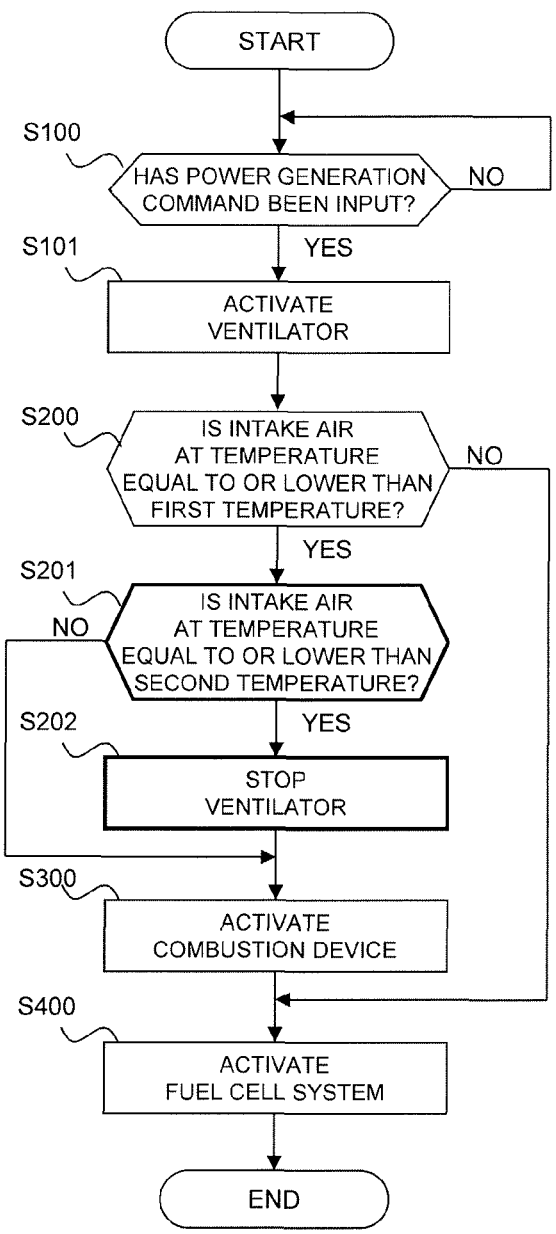
FIG. 4 is a flowchart showing an operation of the power generation system according to Example 3.

FIG. 4 is a flowchart showing an operation of the power generation system 100 according to Example 3. In a flow shown in FIG. 4, the process of each step illustrated in Example 2 is performed. However, in Example 3, each of processes of steps S201 and S202 is performed between the process of step S200 and the process of step S300.

To be specific, in Example 3, when there is an input of a power generation command (step S100) and the ventilator 15 is activated (step S101), and the intake air is determined to be at a temperature equal to or lower than the first temperature T1 (step S200: YES), a determination is made as to whether the intake air is at a temperature equal to or lower than a second temperature T2 (step S201). In Example 3, the second temperature T2 is set to a temperature lower than the first temperature T1.

Also, when the intake air is determined to be at a temperature equal to or lower than the second temperature T2 (step S201: YES), the ventilator 15 that has been activated in step S101 is stopped (step S202), and the combustion device 30 is activated (step S300). On the other hand, when the intake air is determined to be at a temperature higher than the second temperature T2 (step S201: NO), the combustion device 30 is activated without stopping the ventilator 15 (step S300). After the combustion device 30 is activated in this way, the fuel cell system 10 is activated (step S400).

Accordingly, since the ventilator 15 is stopped when the intake air is at a low temperature equal to or lower than the second temperature T2, it is possible to prevent freezing inside the system due to the low-temperature intake air. Further, since the combustion device 30 operates while the ventilator 15 is stopped, it is possible to heat the exhaust gas passage 61 using the high-temperature flue gas. Accordingly, it is possible to heat the intake air that flows through the exhaust gas passage 61 in contact with the exhaust gas passage 61.

Example 4 of Freezing Prevention Process

Figure 5:
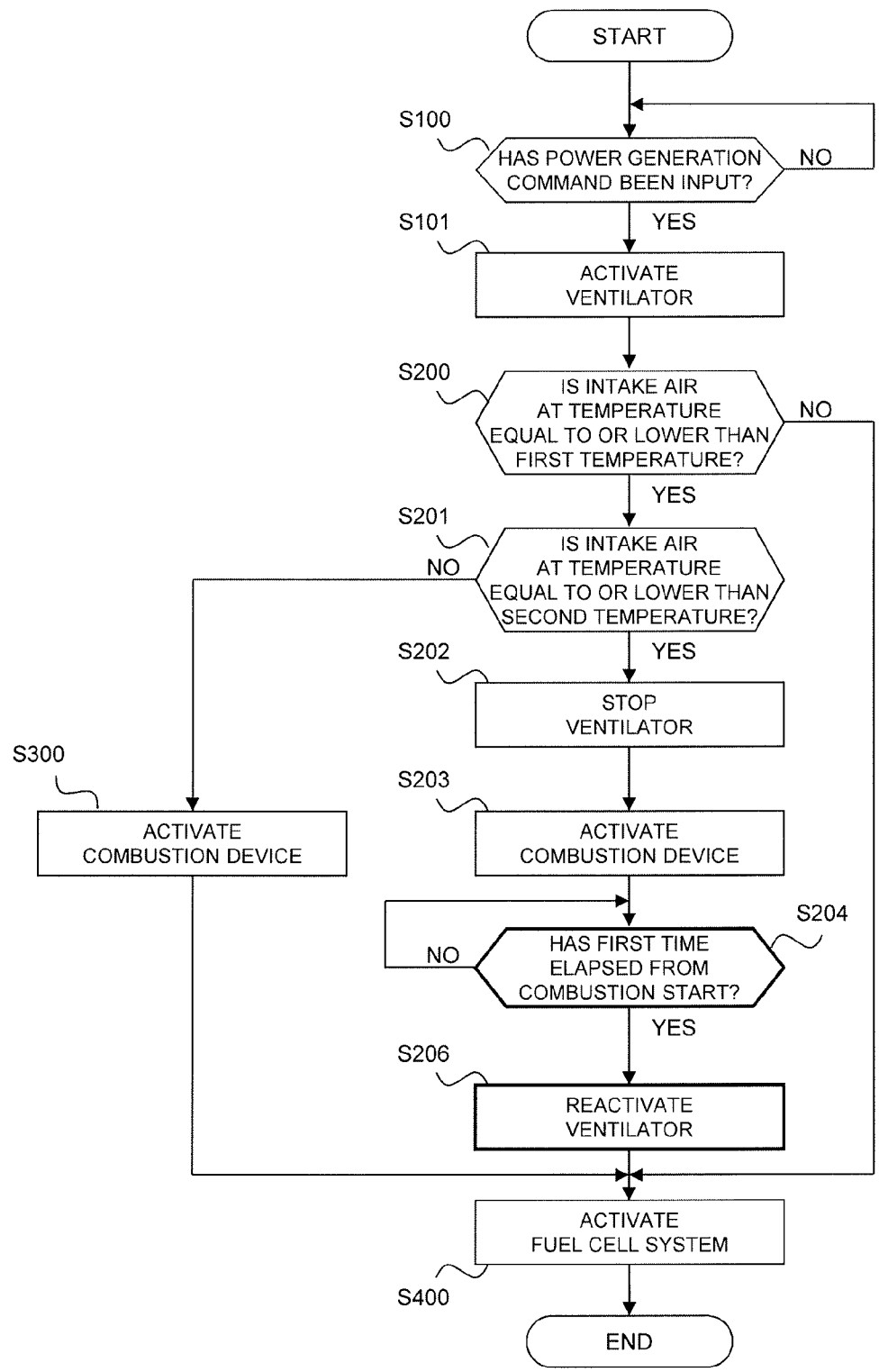
FIG. 5 is a flowchart showing an operation of the power generation system according to Example 4.

FIG. 5 is a flowchart showing an operation of the power generation system 100 according to Example 4. In a flow shown in FIG. 5, the respective processes of steps S100, S101, S200, and S201 illustrated in Example 3 are performed. Also, if it is determined in step S201 that the intake air is at a temperature equal to or lower than the second temperature, the process different from that in Example 3 is performed.

To be specific, when the controller 50 determines that the intake air is at a temperature equal to or lower than the second temperature (step S201: YES), the ventilator 15 is stopped (step S202) and the combustion device 30 is activated (step S203). Next, an elapsed time after the activation of the combustion device is measured, and a determination is made as to whether a first time has elapsed from combustion start (step S204). Also, if the first time has not elapsed (step S204: NO), the process of step S204 is repeatedly performed. On the other hand, if the first time is determined to have elapsed (step S204: YES), the stopped ventilator 15 is activated again (step S206), and then the fuel cell system 10 is activated (step S400). Further, when the intake air is determined to be at a temperature higher than the second temperature (step S201: NO), the combustion device 30 is activated (step S300) and then the fuel cell system 10 is activated (step S400), as in Example 3.

In this case, when the intake air is at a low temperature equal to or lower than the second temperature, introduction of the intake air may be stopped after the activation of the combustion device 30 and until a state is reached in which a high-temperature flue gas can be generated. In other words, since the intake air is taken in after the activation of the combustion device 30 and after the state is reached in which the high-temperature flue gas can be generated, the low-temperature intake air can be reliably heated.

Example 5 of Freezing Prevention Process

Figure 6:
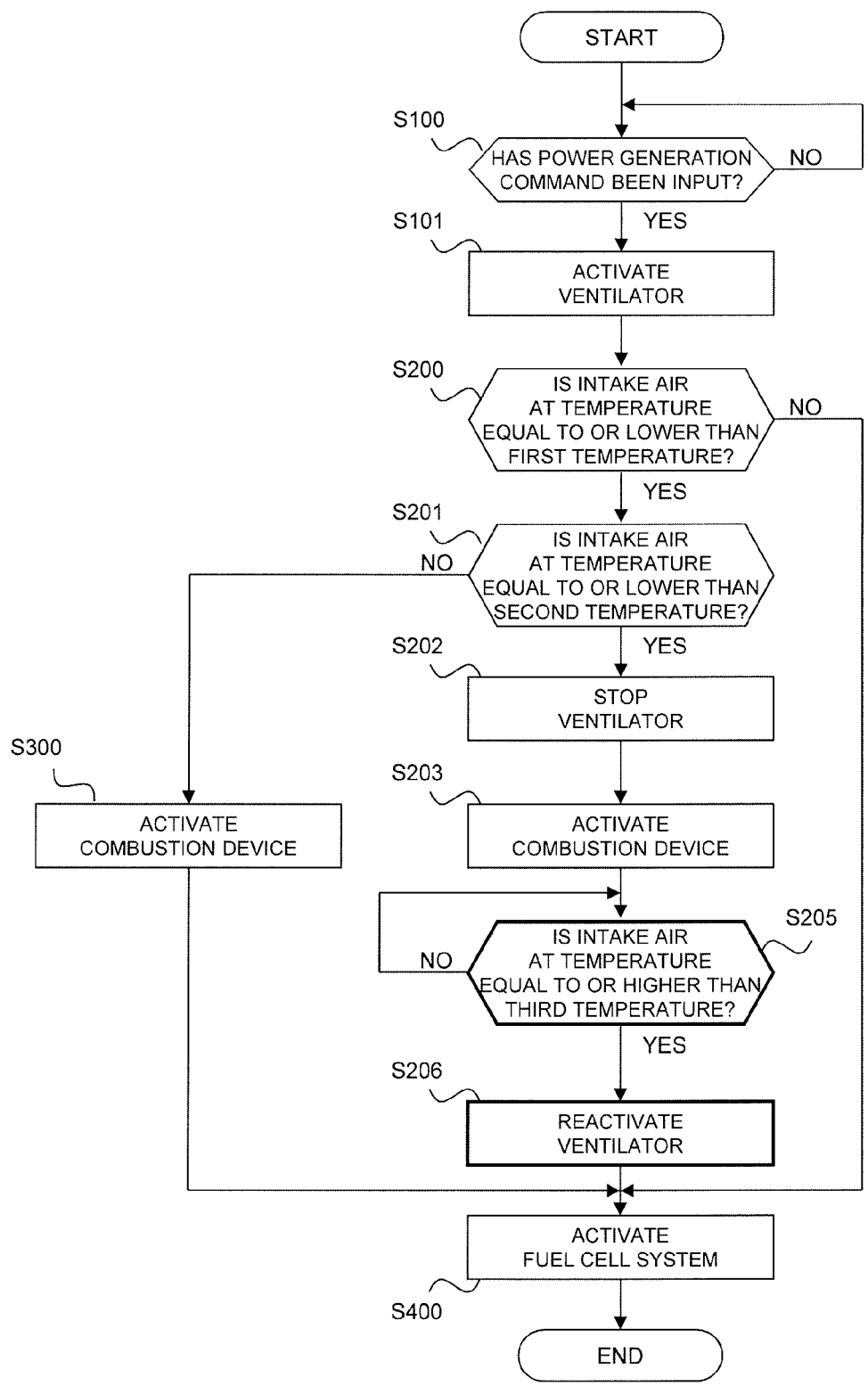
FIG. 6 is a flowchart showing an operation of the power generation system according to Example 5.

FIG. 6 is a flowchart showing an operation of the power generation system 100 according to Example 5. A flow shown in FIG. 6 differs from the flow illustrated in Example 4 in that the process of step S204 in the flow illustrated in Example 4 is replaced with a process of step S205. That is, in Example 4, a reactivation timing of the stopped ventilation unit 15 is determined based on an elapsed time from the activation of the combustion device 30. On the other hand, in Example 5, the timing is determined based on the temperature of the intake air, which is detected by the air intake temperature detector 51.

More specifically, when the combustion device 30 is activated (step S203) in a state where the ventilator 15 is in the stop state (step S202), the controller 50 determines whether the intake air is at a temperature equal to or higher than a third predetermined temperature (step S205). Also, if the intake air is at a temperature lower than the third temperature T3 (step S205: NO), the process in step S205 is repeatedly performed. On the other hand, when the intake air is determined to be at a temperature equal to or higher than the third temperature T3 (step S205: YES), the stopped ventilator 15 is reactivated (step S206). Then, the fuel cell system 10 is activated (step S400).

Even in this case, since the intake air heated to an appropriate temperature can be taken in, it is possible to reliably prevent the freezing of the system. The "third temperature" is not particularly limited as long as it is higher than the second temperature T2 and may be appropriately determined in consideration of an installation environment of the power generation system 100.

Example 6 of Freezing Prevention Process

Figure 7:
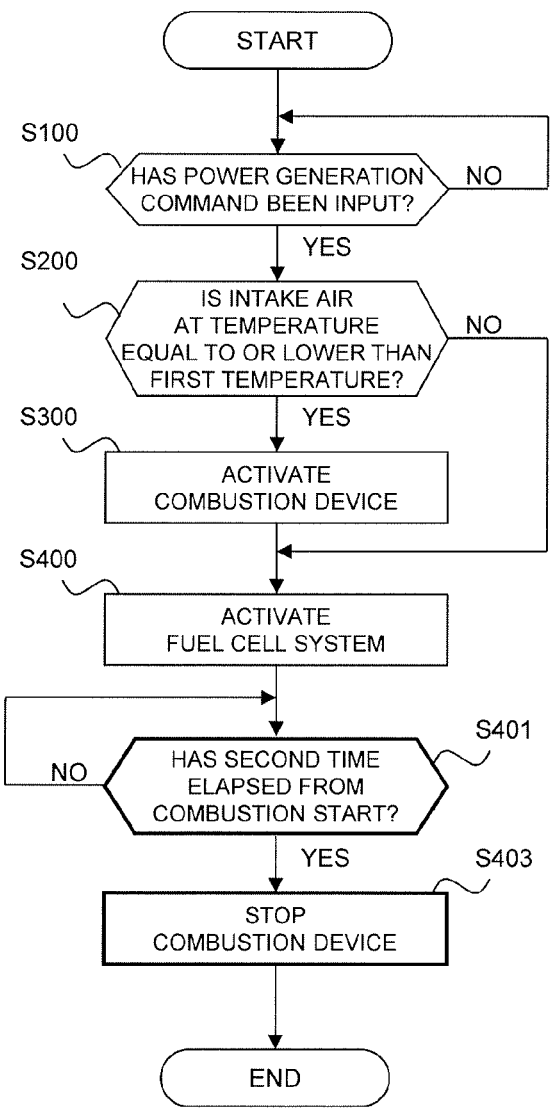
FIG. 7 is a flowchart showing an operation of the power generation system according to Example 6.

FIG. 7 is a flowchart showing an operation of the power generation system 100 according to Example 6. Even in a flow shown in FIG. 7, the process of each step shown in the flow of Example 1 (see FIG. 2) is performed. However, in Example 6, after the fuel cell system is activated (step S400), a process of stopping the combustion device 30 is performed based on a predetermined condition (steps S401 and S403).

To be more specific, when the intake air is at a temperature equal to or lower than the first temperature T1 (step S200: YES) and the combustion device 30 is activated (step S300), the controller 50 activates the fuel cell system 10 (step S400). Also, the controller 50 measures a time elapsed since the combustion device 30 is activated to determine whether a second time has elapsed from the start of combustion (step S401). If the second time has not elapsed (step S401: NO), the process in step S401 is repeatedly performed. Further, the fuel cell system 10 performs an activation operation or a power generation operation during this time. On the other hand, when the controller 50 determines that the second time has elapsed (step S401: YES), the controller 50 stops the combustion device 30 (step S403). That is, the controller 50 continues to cause the fuel cell system 10 to operate in a state where the combustion device 30 is stopped.

In the fuel cell system 10, if a predetermined time has elapsed from the activation, an exhaust gas temperature becomes sufficiently high, and accordingly, the intake air flowing through the air intake passage 62 can be appropriately heated through heat exchange between the high-temperature exhaust gas flowing through the exhaust gas passage 61 and the intake air. Alternatively, in the fuel cell system 10, when a predetermined time has elapsed from the activation, a temperature of the entire system increases due to heat generated in the hydrogen generation device or the like, and accordingly, freezing does not easily occur due to the low-temperature intake air. Thus, if the operation flow as in Example 6 is adopted, the combustion device 30 is stopped when the possibility of freezing is reduced (when the second time has elapsed). Accordingly, it is possible to prevent consumption of the fuel in the combustion device 30.

Example 7 of Freezing Prevention Process

Figure 8:
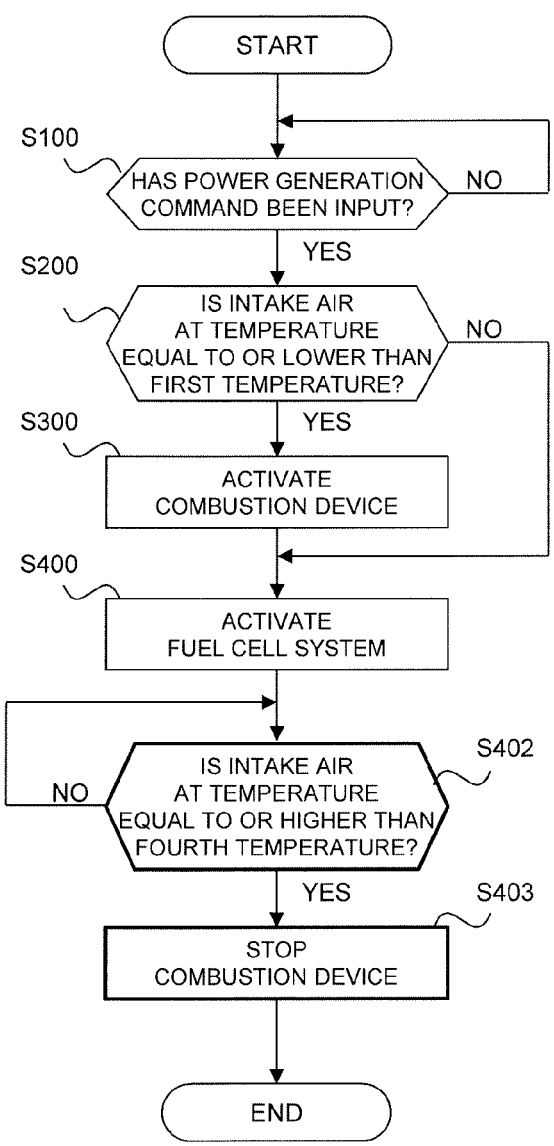
FIG. 8 is a flowchart showing an operation of the power generation system according to Example 7.

FIG. 8 is a flowchart showing an operation of the power generation system 100 according to Example 7. A flow shown in FIG. 8 differs from the flow illustrated in Example 6 in that the process of step S401 in the flow illustrated in Example 6 is replaced with a process of step S402. That is, in Example 6, a stop timing of the combustion device 30 is determined based on an elapsed time from the activation of the combustion device 30. On the other hand, in Example 7, the timing is determined based on the temperature of the intake air, which is detected by the air intake temperature detector 51.

To be more specific, when the combustion device 30 is activated (step S300) and the fuel cell system 10 is activated (step S400), the controller 50 acquires the temperature of the intake air from the air intake temperature detector 51. Also, a determination is made as to whether the intake air is at a temperature equal to or higher than a fourth predetermined temperature T4 (step S402). If the intake air is at a temperature lower than the fourth temperature T4 (step S402: NO), step S402 is performed repeatedly. Further, the fuel cell system 10 performs an activation operation or a power generation operation during this time. On the other hand, when the controller 50 determines that the intake air is at a temperature higher than the fourth temperature T4 (step S402: YES), the combustion device 30 is stopped (step S403). That is, the controller 50 continues to cause the fuel cell system 10 to operate in a state where the combustion device 30 is stopped.

Accordingly, the intake air is heated by the heat exchange with the flue gas by operating the combustion device 30 when the intake air is at a low temperature equal to or lower than the first temperature, and it is possible to prevent the consumption of the fuel by stopping the combustion device 30 when the possibility of freezing in the fuel cell system 10 is reduced (when the intake air is at a temperature equal to or higher than the fourth temperature T4). Further, the fourth temperature T4 may be acquired, through a test or the like in advance, as a temperature of the intake air in which the system does not freeze even when the combustion device 30 is stopped. Alternatively, an appropriate predetermined value (e.g., a temperature equal to or higher than 0° C.) may be set as the fourth temperature T4, without conducting the test or the like.

Further, in Example 6 or 7, when a predetermined condition is satisfied (step S401: YES, or step S402: YES), the combustion device 30 is stopped (step S403), but the combustion device 30 may be activated again, if necessary. For example, even after the combustion device 30 is stopped, the temperature of the intake air may be continuously detected by the air intake temperature detector 51 and the combustion device 30 may be activated when the temperature becomes lower than the first temperature T1.

Example 8 of Freezing Prevention Process

Figure 9:
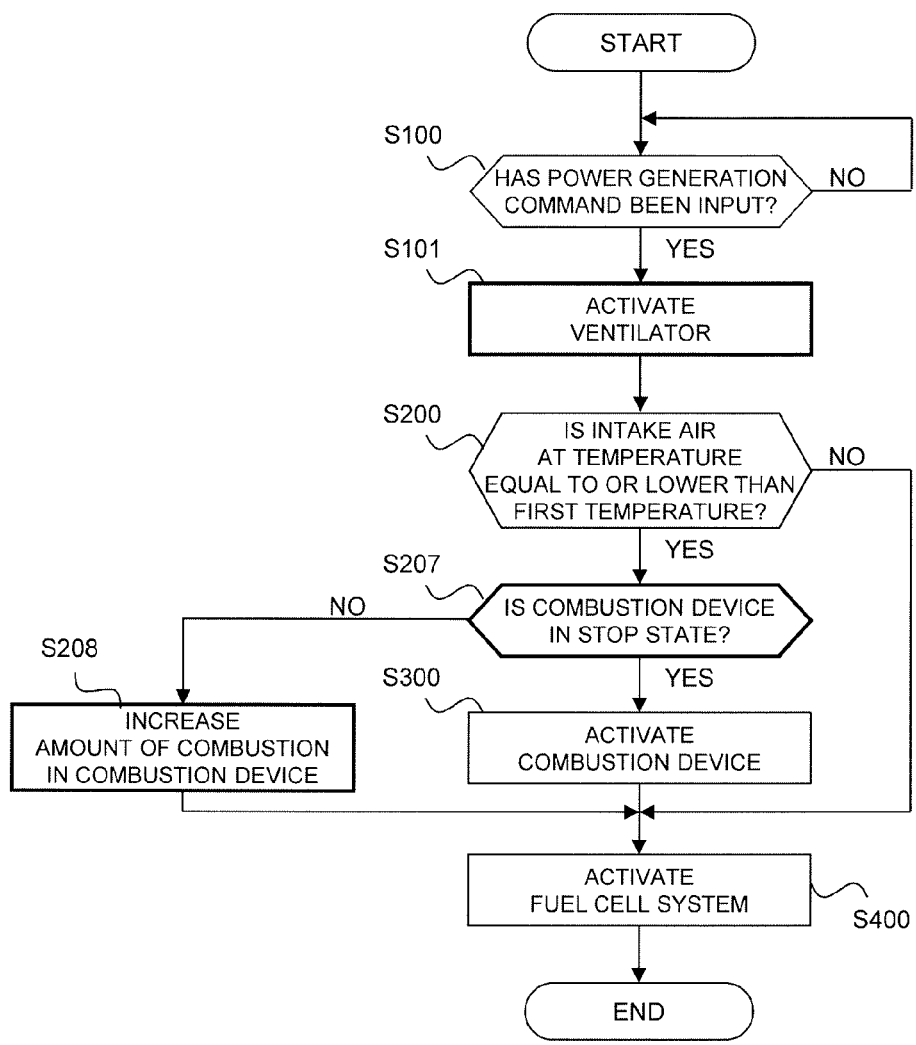
FIG. 9 is a flowchart showing an operation of the power generation system according to Example 8.

FIG. 9 is a flowchart showing an operation of the power generation system 100 according to Example 8. In a flow shown in FIG. 9, the process of each step of the flow illustrated in Example 2 (see FIG. 3) is performed, but they differ in that steps S207 and S208 are further performed in the flow shown in FIG. 9.

To be specific, in the flow according to Example 8, the ventilator 15 is activated (step S101). When the intake air is at a temperature equal to or lower than the first temperature T1 (step S200: YES), a determination is made as to whether the combustion device 30 is in stop state (step S207). Here, if the combustion device 30 is in the stop state, activation of the combustion device 30 (step S300) and activation of the fuel cell system 10 (step S400) are performed, as in Example 2. On the other hand, if the combustion device 30 is not in the stop state, i.e., if the combustion device 30 is determined to be in operation (step S207: NO), an amount of combustion in the combustion device 30 is increased (step S208). For example, an amount of the combustion fuel supplied to the combustor 31 is increased and an amount of air for combustion supplied by the combustion fan 32 is increased.

Accordingly, when the intake air is equal to or lower than the first temperature T1 in a state where the combustion device 30 is already operating, an amount of heat of the flue gas can be increased by increasing a combustion amount in the combustion device 30. Thus, the intake air can be more appropriately heated.

Embodiment 2

Figure 10:
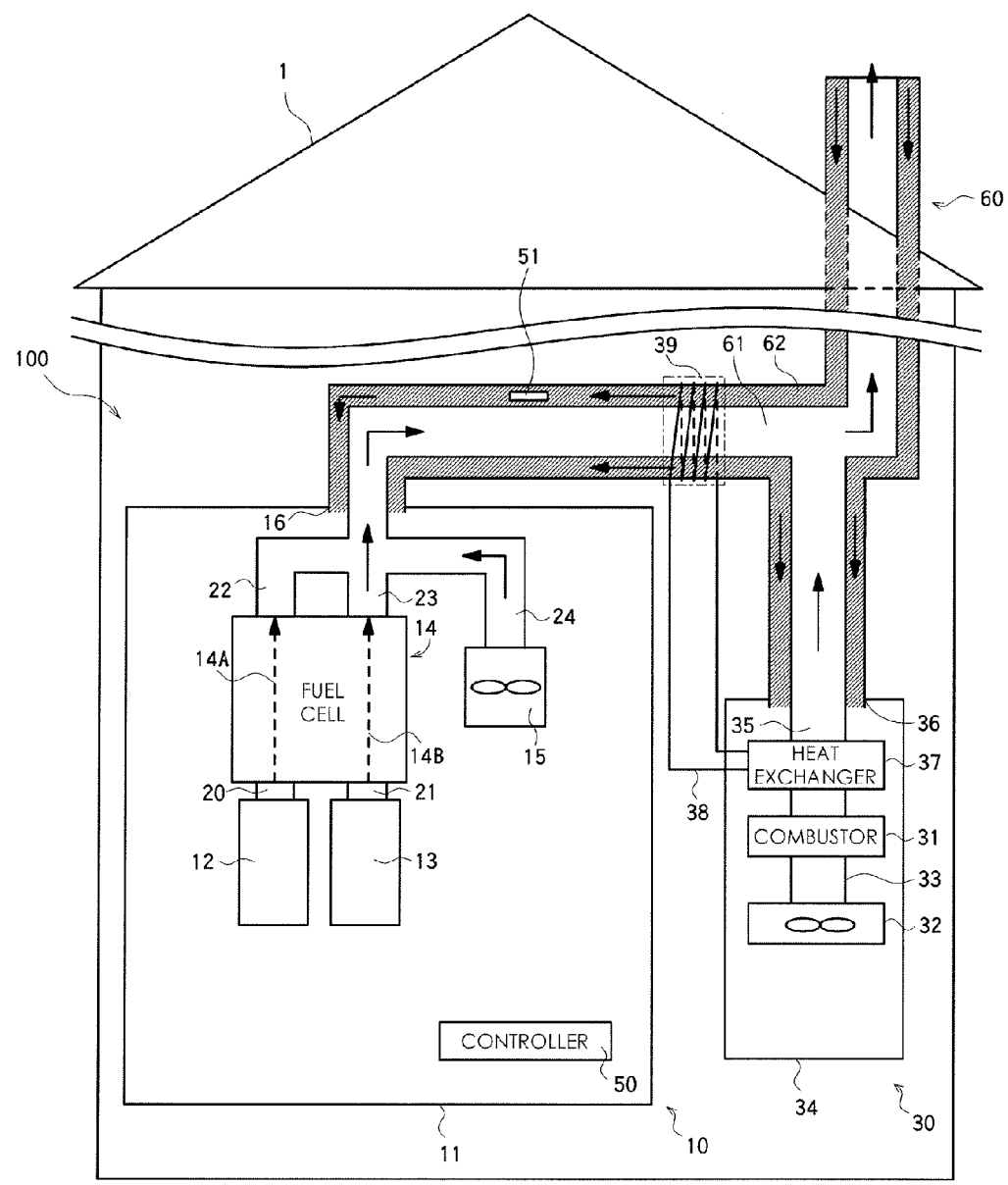
FIG. 10 is a schematic diagram showing a schematic configuration of a power generation system according to Embodiment 2.

FIG. 10 is a schematic diagram showing a schematic configuration of a power generation system according to Embodiment 2. A power generation system 100 according to Embodiment 2 has the same configuration as the power generation system 100 according to Embodiment 1, except for the following. That is, the combustion device 30 includes a heat exchanger 37 and a water circulation passage 38.

The heat exchanger 37 is provided on the path of the flue gas passage 35, and the water circulation passage 38 is provided between the heat exchanger 37 and the double pipe, which forms the air intake and exhaust mechanism 60. The water circulation passage 38 guides water heated by the flue gas flowing through the heat exchanger 37 to the double pipe, which forms the air intake and exhaust mechanism 60, such that heat exchange between the water and the intake air flowing through the air intake passage 62 occurs. The water whose temperature becomes low due to the heat exchange with the intake air is returned to the heat exchanger 37 through the water circulation passage 38, and heated by the flue gas again. In this way, a part of the air intake passage 62 forms a heating portion 39 heated by the heat of the flue gas.

In Embodiment 2, the heating portion 39 is provided in a portion of the air intake passage 62 between the branch portion and the fuel cell system 10. More specifically, the heating portion 39 is provided in the above portion at a position on the upstream side in a flow direction of the intake air, relative to an installation position of the air intake temperature detector 51. However, the arrangement of the heating portion 39 is not limited thereto, and the heating portion 39 may be provided in an appropriately selected position.

Further, in Embodiment 2, a configuration in which the water circulation passage 38 is wound around the double pipe in the heating portion 39 is illustrated, but the present invention is not limited thereto. For example, the water circulation passage 38 may pass through the inside of the air intake passage 62. Further, in this case, fins may be provided with the water circulation passage 38 inside the air intake passage 62 to improve heat exchange efficiency.

Even in the power generation system 100 according to Embodiment 2, it is possible to suitably realize freezing prevention inside the system by performing the operation flow according to each example described in Embodiment 1.

Embodiment 3

Figure 11:
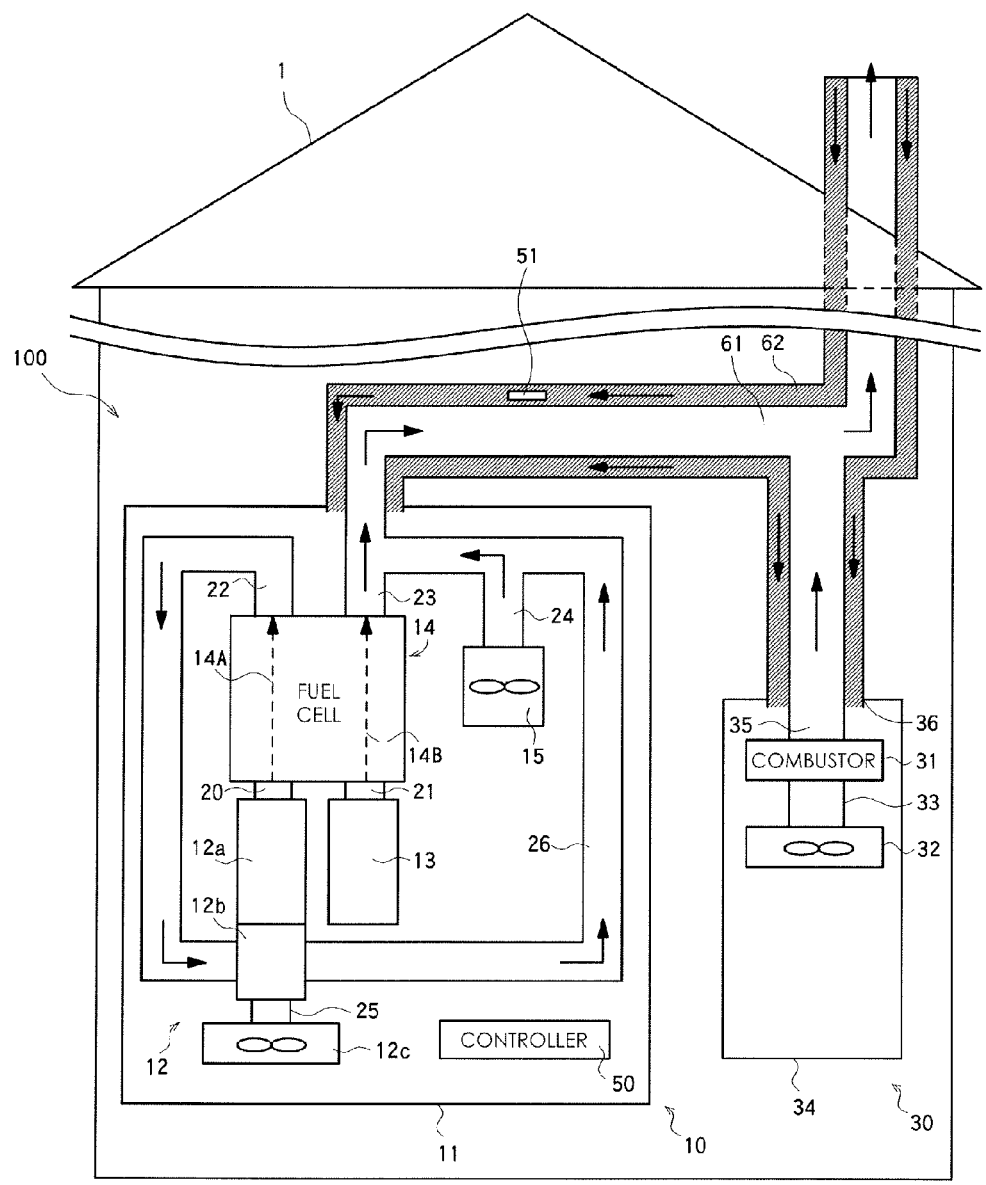
FIG. 11 is a schematic diagram showing a schematic configuration of a power generation system according to Embodiment 3.

FIG. 11 is a schematic diagram showing a schematic configuration of a power generation system according to Embodiment 3. A power generation system 100 according to Embodiment 3 has the same configuration as the power generation system 100 according to Embodiment 1 except for the configuration of the fuel gas supply unit 12 and a passage for discharge of the off fuel gas from the fuel cell 14. To be specific, the fuel gas supply unit (hereinafter referred to as a "hydrogen generation device" in the present embodiment) 12 includes a reformer 12a, a combustor 12b, and a combustion fan 12c.

A downstream end of the off fuel gas passage 22 from the fuel cell 14 is connected to the combustor 12b, and the off fuel gas from the fuel cell 14 is supplied as a fuel for combustion through the off fuel gas passage 22. Further, the combustion fan 12c is connected to the combustor 12b through an air supply passage 25. The combustion fan 12c may have any configuration capable of supplying the combustion air to the combustor 12b and, for example, the combustion fan 12c may be constituted by a fan, a blower, or the like. Further, an upstream end of a flue gas passage 26 is connected to the combustor 12b, and a downstream end of the flue gas passage 26 is connected to the exhaust gas passage 61 (more accurately, the first exhaust gas upstream end 61a).

Such a combustor 12b combusts the off fuel gas and the combustion air to generate a flue gas and heat. The flue gas generated in the combustor 12b heats the reformer 12a or the like and then is discharged to the outside of the power generation system 100, i.e., the outside of the building 1 through the flue gas passage 26 and the exhaust gas passage 61.

A raw material supply unit and a steam supply unit, which are not shown, are connected to the reformer 12a, and a raw material and steam are supplied to the reformer 12a. A natural gas mainly containing methane, an LP gas, or the like can be used as the raw material.

Further, the reformer 12a includes a reforming catalyst. For example, any material capable of catalyzing a steam reforming reaction to generate a hydrogen-containing gas from a raw material and steam may be used as the reforming catalyst. For example, a ruthenium-based catalyst in which ruthenium (Ru) is carried by a catalyst carrier such as alumina, a nickel-based catalyst in which nickel (Ni) is carried by such a catalyst carrier, and the like may be used.

Also, in the reformer 12a, the hydrogen-containing gas is generated by the reforming reaction between the supplied raw material and the steam. The generated hydrogen-containing gas is supplied as a fuel gas to the fuel gas channel 14A of the fuel cell 14 through the fuel gas supply passage 20.

Further, in Embodiment 3, while the hydrogen-containing gas generated in the reformer 12a is supplied as the fuel gas to the fuel cell 14, the present invention is not limited thereto. For example, in the hydrogen generation device 12, hydrogen generated by the reformer 12a is passed through a transforming catalyst having a transformer so that carbon monoxide is reduced, is passed through a carbon monoxide remover containing an oxidation catalyst or a methanation catalyst, and then is supplied to the fuel cell 14. For example, a copper-zinc-based catalyst may be used as the transforming catalyst and a ruthenium-based catalyst may be used as the oxidation catalyst or the methanation catalyst.

Further, the configuration in which, in the present fuel cell system 10, the off fuel gas from the fuel cell 14 is supplied as the fuel for combustion to the combustor 12b has been illustrated, but the present invention is not limited thereto. For example, a fuel for combustion from a combustion fuel supply unit may be separately supplied to the combustor 12b.

Even in this power generation system 100 according to Embodiment 3, it is possible to suitably realize freezing prevention inside the system by performing the operation flow according to each example described in Embodiment 1.

However, in the case of the power generation system 100 according to Embodiment 3, it is necessary to operate the hydrogen generation device 12 and heat the reforming catalyst in the reformer 12a to a temperature suitable for the reforming reaction in order to activate the fuel cell system 10. For this reason, the combustor 12b combusts the fuel for combustion and the combustion air. In this case, when the combustion fan 12c operates to supply the combustion air to the combustor 12b, external air is supplied into the case 11 through the air intake passage 62. However, by the operation of the combustion device 30 (step S300), the external air flowing through the air intake passage 62 is heated by the flue gas from the combustion device 30 flowing through the exhaust gas passage 61. Accordingly, it is possible to prevent water inside the fuel cell system 10 from freezing even when an external air temperature is below a freezing point.

INDUSTRIAL APPLICABILITY

The power generation system and the method of operating the power generation system of the present invention may be applied to a power generation system and a method of operating the power generation system capable of preventing water in the system from freezing due to the intake air, particularly, at the time of activation of the fuel cell system even when the external air temperature is low.

REFERENCE SIGNS LIST

1 Building
10 Fuel cell system
11 Case
14 Fuel cell
30 Combustion device
50 Controller
51 Air intake temperature detector
60 Air intake and exhaust mechanism
61 Exhaust gas passage
62 Air intake passage
100 Power generation system

The invention claimed is:

1. A power generation system comprising:
an air intake passage;
a fuel cell system including a fuel cell configured to generate electric power using a fuel gas and an oxidizing gas, a case configured to house the fuel cell, and an air supply unit configured to supply external air to the case through the air intake passage;
an air intake temperature detector configured to detect a temperature of the intake air supplied to the case;
a combustion device provided outside of the case and including a combustor configured to combust a fuel to generate an amount of heat such that the generated heat is used to heat water;
an exhaust gas passage including a first passage extending from an upstream end connected to the fuel cell system and configured to discharge an exhaust gas from the fuel cell system, a second passage extending from an upstream end connected to the combustion device and configured to discharge a flue gas generated in the combustion device to the outside, a joining portion in which both of the first and second passages are joined, and a common passage extending from the joining portion to a downstream end opened to atmosphere and configured to discharge the exhaust gas from the fuel cell system and the flue gas generated in the combustion device to the outside; and
a controller, wherein:
the air intake passage and the exhaust gas passage are provided such that the air intake passage makes contact with at least a portion of the exhaust gas passage so as to allow heat exchange to occur between media flowing through the passages, and
the controller causes the air intake temperature detector to detect the temperature of the intake air supplied to the case when a power generation command is input to the power generation system, and causes the combustion device to operate when the temperature detected by the air intake temperature detector is equal to or lower than a first predetermined temperature.

2. The power generation system according to claim 1, wherein:
the air intake temperature detector is provided in the air intake passage or the case, and
the controller causes the combustion device to operate when the temperature detected by the air intake temperature detector after operation of the air supply unit is equal to or lower than the first temperature.

3. The power generation system according to claim 2, wherein:
when the temperature detected by the air intake temperature detector after the operation of the air supply unit is equal to or lower than a second predetermined temperature, the controller stops the air supply unit and causes the combustion device to operate.

4. The power generation system according to claim 3, wherein:
when the air supply unit is stopped as the air intake temperature detector detects a temperature equal to or lower than the second temperature, the controller causes the combustion device to operate for a predetermined first time, and then causes the air supply unit to operate and activates the fuel cell system.

5. The power generation system according to claim 3, wherein:
when the air supply unit is stopped as the air intake temperature detector detects a temperature equal to or lower than the second temperature, the controller causes the combustion device to operate until the air intake temperature detector detects a temperature equal to or higher than a third predetermined temperature, and then causes the air supply unit to operate and activates the fuel cell system.

6. The power generation system according to claim 3, wherein:
the second temperature is set to be equal to or lower than the first temperature.

7. The power generation system according to claim 1, wherein:
when the temperature detected by the air intake temperature detector is equal to or lower than the first temperature, the controller causes the combustion device to operate for a predetermined second time, and then stops the combustion device.

8. The power generation system according to claim 1, wherein:
when the temperature detected by the air intake temperature detector is equal to or lower than the first temperature, the controller causes the combustion device to operate until the temperature detected by the air intake temperature detector is equal to or higher than a fourth predetermined temperature, and then stops the combustion device.

9. The power generation system according to claim 1, wherein:
when the temperature detected by the air intake temperature detector is equal to or lower than the first temperature, the controller causes the combustion device to operate before the activation of the fuel cell system.

10. A method of operating a power generation system including a fuel cell system including a fuel cell housed in a case, a combustion device provided outside of the case and including a combustor configured to combust a fuel to generate an amount of heat such that the generated heat is used to heat water, an air intake passage configured to supply external air to the fuel cell system, an exhaust gas passage configured to discharge a flue gas generated in the combustion device to the outside, an exhaust gas passage including a first passage extending from an upstream end connected to the fuel cell system and configured to discharge an exhaust gas from the fuel cell system, a second passage extending from an upstream end connected to the combustion device and configured to discharge a flue gas generated in the combustion device to the outside, a joining portion in which both of the first and second passages are joined, and a common passage extending from the joining portion to a downstream end opened to atmosphere and configured to discharge the exhaust gas from the fuel cell system and the flue gas generated in the combustion device to the outside, and the air intake passage and the exhaust gas passage are provided such that the air intake passage makes contact with at least a portion of the exhaust gas passage so as to allow heat exchange to occur between media flowing through the passages, the method comprising the steps of:
detecting a temperature of the intake air supplied to the case through the air intake passage, when a power generation command is input to the power generation system;
determining whether the temperature of the intake air is equal to or lower than a first predetermined temperature; and
causing the combustion device to operate when the temperature of the intake air is equal to or lower than the first temperature.

* * * * *